Sept. 25, 1956
S. K. JOHNSON
2,764,348
ENDLESS BELT SLIDE RULE
Filed Jan. 19, 1953
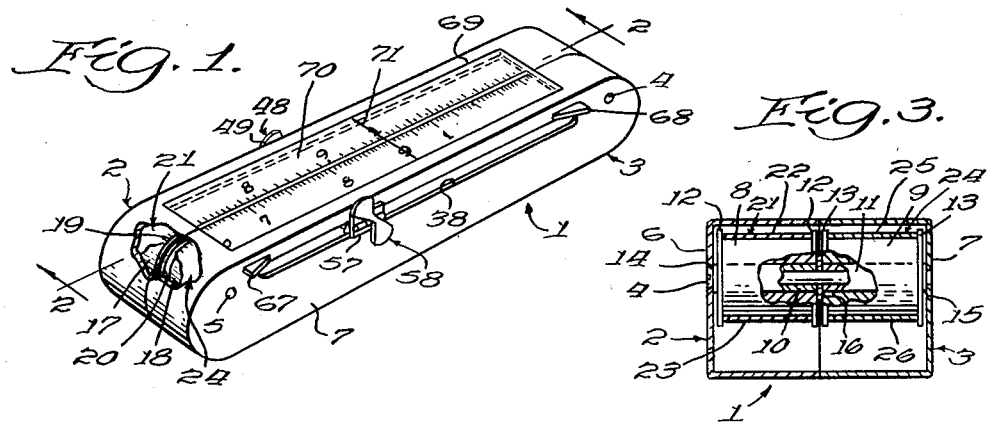
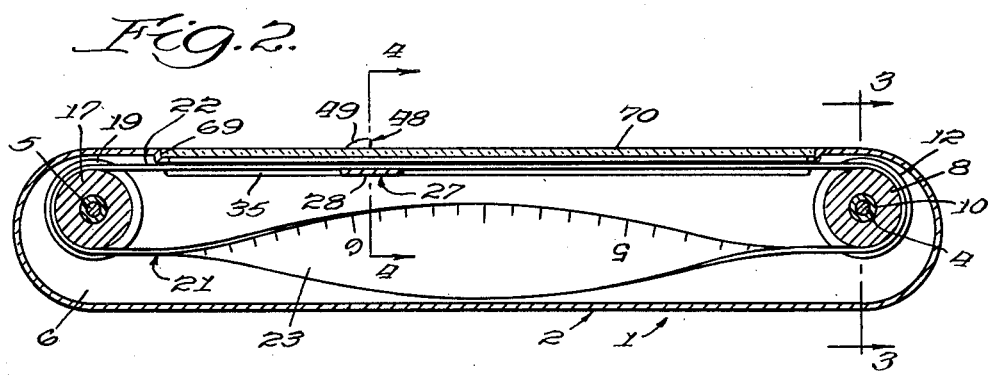
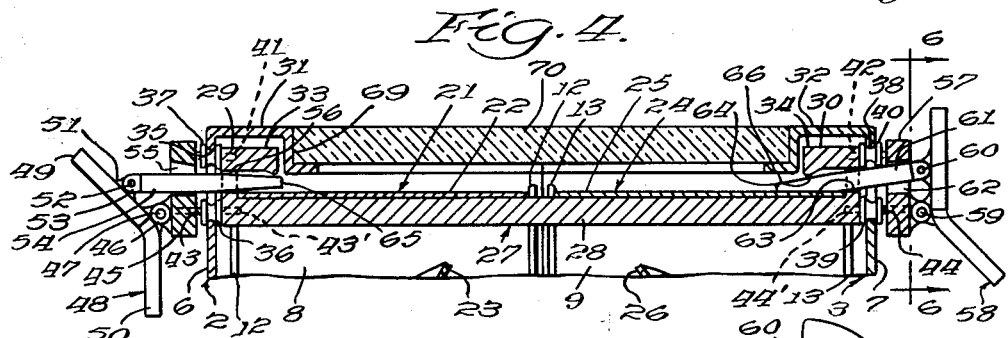
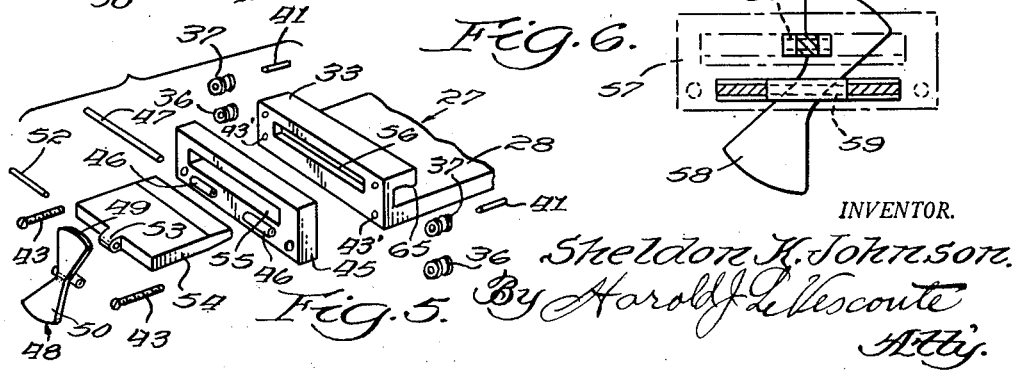
INVENTOR.
Sheldon K. Johnson.
By Harold J. Lescoute
Atty.

United States Patent Office 2,764,348
Patented Sept. 25, 1956

2,764,348

ENDLESS BELT SLIDE RULE

Sheldon K. Johnson, Van Nuys, Calif.

Application January 19, 1953, Serial No. 331,913

6 Claims. (Cl. 235—71)

This invention relates to calculating machines and more particularly to a form thereof employing logarithmic scales in the manner of slide rules and characterized by an increased length of scale for a given overall length of the device.

In my prior Patent No. 2,578,705 there is disclosed a slide rule type of calculator having a plurality of flexible scale bearing tapes movable back and forth between a spaced pair of parallel tape coil receiving and dispensing devices; said tapes being movable both independently and in unison in the making of calculations and the length of scales being limited by the length of the tapes. Attempts have also been made to construct endless belt types of logarithmic calculating devices, but in all such cases the length of the scale has been limited to the length of the outer perimeter of the belt element on which the scale is carried.

The accuracy with which a logarithmic scale can be read depends on the overall length of the scale and the resultant availability of space for graduations and for the accurate printing or otherwise applying the graduations to the surface of the scale bearing element. The longer the scale, the greater the extent to which significant numbers can be indicated by graduations and the greater the accuracy with which calculations can be made. One common expedient in efforts to obtain greater accuracy within a given length of scale has been the formation of scales with the graduations thereof so closely compressed that they can be set and read only with the aid of magnification, but this practice is limited by the width of the lines and the necessity of providing observable space between adjacent lines and, as will hereinafter be apparent, the advantage thus derived can be equally well applied to the present invention with increased capacity for accuracy. Practically, the desire of the user is for the smallest slide rule that will serve the desired purpose with the desired degree of accuracy, and the present most common compromise between the desire for accuracy and convenient size of device is the so-called ten inch size of slide rule which can be read only to three significant numbers at the lower end of the scale and to not more than two significant numbers at the upper end of the scale with the same allowance for error. Greater accuracy is provided by twenty inch slide rules, but the device is cumbersome to carry and use and is not preferred for that reason in many cases. If the scales were formed as straight endless belts, a calculating device having the equivalent of the scale of the common ten inch slide rule could be provided in a case or mounting slightly less than half the length of the perimeter of the belt depending on the proportion of the belt trained over the pulleys or other supporting means therefor, and correspondingly, longer scales so formed could be presented on mounting means of somewhat less than half the overall length of the scale so presented.

With the foregoing considerations in mind, it is an object of the present invention to provide an endless belt type of calculating device of novel and simple construction capable of employing a logarithmic system having scale bearing elements presenting scales of twice the linear length of a flat belt trained over the belt supporting means with resultant realization of capacity for greater accuracy in a device of a given size.

A further object of the invention is to provide a slide rule type of calculator employing movable scale bearing flexible elements and having improved means for effecting selectively the independent and simultaneous movement of the scale bearing elements in the making of calculations.

With the foregoing objects in view, together with such additional objects and advantages as may subsequently appear, the invention resides in the individual parts, and in the construction, combination and arrangement of such parts described, by way of example, in the following specification of one mode of execution of the invention; reference being had to the accompanying drawings which form a part of said specification and in which drawings:

Fig. 1 is a top perspective view of a slide rule type of calculating device embodying the present invention; a portion of the case being broken away to show interior details, Fig. 2 is an enlarged, longitudinal view taken on the line 2—2 of Fig. 1, Fig. 3 is a transverse sectional view taken on the line 3—3 of Fig. 2, portions of some of the parts being broken away for clearness of illustration, Fig. 4 is a still further enlarged, fragmentary sectional view taken on the line 4—4 of Fig. 2, Fig. 5 is a fragmentary, exploded view of the component parts at one end of the scale transporting means, and Fig. 6 is a transverse sectional view taken on the line 6—6 of Fig. 4.

Referring to the drawings the illustrated embodiment of the invention comprises a hollow case 1 of generally rectangular configuration having rounded end portions. As shown, the case 1 is composed of reversely identical halves 2 and 3 meeting on the longitudinal vertical medial line of the case. The halves 2 and 3 are secured to each other to form the case by screws 4 and 5 located at the opposite ends of the case with the heads thereof engaging the sidewall 6 of the case half 2 and the threaded ends thereof engaging the sidewall 7 of the case half 3. Additionally, the screw 4 between the side walls 6 and 7 serves as a supporting axle for a pair of freely rotatable tape supporting spools 8 and 9 having bearing bushings 10 and 11 and having tape retaining flanges 12, 12 and 13, 13. Washers 14 and 15 mounted on the screw 4 serve to space the outer ends of the spools 8 and 9 from the case sidewalls and a washer 16 interposed between the adjacent ends of the spools likewise serves to prevent frictional interengagement between said adjacent spool ends. The screw 5 similarly supports a pair of spools 17 and 18 which are directly opposite the spools 8 and 9, respectively; the spools 17 and 18 being similarly spaced from the sidewalls of the case and from each other by washers and having tape retaining flanges 19, 19 and 20, 20, respectively.

Trained over the spools 8 and 17 and retained thereon by the flanges 12, 12 and 19, 19 is an endless tape or belt 21 having an upper straight run 22 and a lower twisted run 23. The belt is formed of a strip of flexible material having the ends joined and as an incident to such joining, one end thereof is inverted or, in other words is given a half twist with resultant formation of a one-sided configuration. It will be obvious that as the belt is moved over the spools the surface exposed to view on the upper straight run 22 will comprise the entire length of both sides of the strip from which the belt was formed and that consequently for a given linear length of belt the spacing of the major increments of a logarithmic scale can be doubled and that the minor increments can be more accurately indicated. For example, a tape of the length of a ten inch slide rule scale thus formed into an endless half twist belt may be trained over a pair of half inch spools slightly over four inches apart, but due to the fact that both sides of the strip are available for carrying the scale indicia, the indicia may be that of a twenty inch straight slide rule. In other words, the overall length of the device is approximately one-fourth the linear length of the scale. Thus a device embodying this invention having the approximate length of the common ten inch slide rule will have a scale surface four times as long with the capacity to be graduated and to be read accurately to a degree of fineness that will satisfy all but the most exacting calculating requirements.

The spools 9 and 18 support a similar belt or tape 24 having a straight upper run 25 and a twisted lower run 26 having the same advantages previously enumerated in connection with the first described belt.

The means for moving the belts 21 and 24 around the supporting spools comprises a carriage 27 including a frame member 28 disposed within the case 1 and extending transversely thereof between the inner faces of the sidewalls 6 and 7 immediately beneath the upper runs 22 and 25 of the belts 21 and 24. At the outer edges of the belts the frame ends 29 and 30 of the member 28 extend upwardly to a point adjacent the under surfaces of the top walls 31 and 32 of the case halves 2 and 3 and thence extend inwardly in arms 33 and 34 overhanging the outer edges of the belts 21 and 24 (see Fig. 4). The sidewall 6 of the case half 2 adjacent the upper edge thereof is provided with a longitudinally extending slot 35 and mounted on the end portion 29 of the carriage frame member 28 is a first pair of grooved rollers 36, 36 engaging the lower edge surface of the slot 35 and a second pair of grooved rollers 37, 37 engaging the upper edge of the slot 35. The side wall 7 of the case half 3 is similarly provided with a longitudinally extending slot 38 and corresponding pairs of grooved rollers 39 and 40 engage the lower and upper edges of the slot 38; all of the said grooved rollers serving to support the carriage frame member for free movement along the tracks provided by the lower and upper edges of the slots 35 and 38.

The upper pairs of rollers 37 and 40 are supported for rotation on studs 41 and 42 projecting outwardly from the ends 29 and 30 of the frame member 28 and the lower pairs of rollers 36 and 39 are carried by screws 43 and 44 threaded into holes 43' and 44' in the ends 29 and 30 of the frame member and extending outwardly beyond the rollers mounted thereon. The outer portions of the screws 43, 43 pass through and support a carriage end member 45 which is of the same general outline in side elevation as the adjacent end of the frame member 28; the interposed rollers 36, 36 serving as spacing means and the upper portion of the member 45 serving to hold the rollers 37, 37 in place on the studs 41, 41 (see Fig. 4).

The lower outer face of the end member 45 is provided with a spaced, aligned pair of horizontally disposed lugs 46, 46 which support a hinge pin 47 and pivotally mounted on this hinge pin is an operating member 48 having upper and lower flange portions 49 and 50 of generally triangular shape in side elevation; the side surfaces of said flange portions lying in planes intersecting each other at an obtuse angle as best shown in Fig. 4. The inner face of the flange portion 49 is provided with a pair of spaced, aligned lugs 51, 51 carrying a horizontally disposed hinge pin 52 which hinge pin also extends through the bearing lug 53 of a wedge member 54 disposed between the lugs 51, 51. The wedge member 54 extends through slots 55 and 56 formed respectively in the end member 45 and the end portion 29 of the frame member 28 and the distal end of the wedge member is slightly tapered as best shown in Figs. 4 and 5 and overlies the run 22 of the belt 21 above the frame member 28.

The end 30 of the frame member 28 is similarly provided with an end member 57 supported by the screws 44 which in turn supports an operating member 58 mounted on a hinge pin 59 and which operating member is connected by a hinge pin 60 to a wedge member 61 extending through aligned slots 62 and 63 in the end member 57 and the end portion 30 of the frame member 28 and terminating in a tapered distal end 64 overlying the run 25 of the belt 24 above the frame member 28.

Referring to Fig. 4, the operating member 48 and the wedge member 54 connected thereto are shown in retracted position and the operating member 58 and wedge member 61 are shown in belt clamping position. As the operating member is rocked from released to clamping position, the outer end of the wedge member is moved along the arc described by the hinge pin which connects the wedge member to the operating member; said movement being simultaneously inwardly and upwardly. In such movement the tapered inner end of the wedges at the upper side thereof engage the downwardly extending rib portions 65 and 66 at the distal ends of the inwardly extending arms 33 and 34 which serve both as abutments for the wedging action of the wedge members and as fulcrums for the leverage action of the upward component of the inward movement of the outer ends of the wedge members derived from the connected operating members and thus serve to cause the inner ends of the wedge members to clamp the belt engaged thereby against the upper surface of the frame member 28. Thus either belt may be moved about its spools by clamping it to the carriage assembly and then moving the carriage along the mounting slots 35 and 38 in the desired direction, and if the extent of movement desired is greater than the length of the slots the clamping action is released; the engagement of the under side of the wedge member with the lower side of the slot 56 incident to the downward component of the outward movement of the outer end of the wedge member assisting in such release, and the carriage brought back and re-clamped to the belt or belts desired to be moved. The outer surfaces of the case side walls are provided with outwardly extending inclined lugs 67 and 68 at each end of the slots 35 and 39 positioned to engage the upper flange portions of the operating members and move them to released position thus contributing to the capacity for rapid reciprocation of the carriage when one or both belts are to be moved a distance greater than can be accommodated by a single traverse of the carriage.

The upper surface of the case is provided with a recessed opening 69 in which a transparent window means 70 is mounted permitting viewing of most of the surface of the straight runs of the belts; said window means having a transverse hair line 71 at its mid length against which the scales on the belts may be read.

The operation of the device is believed to be obvious. First one of the belts is moved to the desired point with reference to the hairline 71 by movement of the carriage assembly and by clamping only the belt to be moved during such movement. Then the other belt is likewise moved to the desired point with reference to the hair line without movement of the first belt and finally, both belts are clamped to the carriage means and are moved in absolute unison until the desired point is reached on one of the belts and the reading taken from the other belt. The device is of such size that it can be held by one hand and the two operating members grasped between the thumb and index finger of the other hand and one or both operating members rocked in either direction to clamp or release one or both belts as may be desired in the solution of a problem.

It is to be noted that each belt may carry several different scales with the corresponding scales carried by the other belt. For example, the "A" and "D" scales may be carried on one belt and the "B" and "C" scales carried on the other belt as well as the inverted "C" scale. Additionally, other special logarithmic scales may be carried on the belts either separately or in addition to the above identified scales commonly employed. Still further, it will be obvious that the graduations of the scales may be so closely formed as to require the aid of magnification for accurate setting and reading with resultant capacity of the device for still more accurate degrees of calculations.

Thus there has been created a novel type of slide rule type of calculator distinguished by extreme compactness of size in relation to the length of scale made available for use and with the resultant greater accuracy in calculations made thereon. The invention is not to be deemed to be limited to the exact form thus disclosed and it includes in its scope all such modifications in the parts and in the construction, combination and arrangement of parts as shall come within the purview of the appended claims.

I claim:

1. In a logarithmic system calculating device, a frame structure formed from a pair of reversely identical halves, a pair of spaced, parallel screws extending transversely of and uniting said halves to form said frame structure; said screws within said frame structure additionally serving as axle members, a first pair of spools mounted one each on each of said axle members adjacent one of said halves, a first endless flat belt type of logarithmic scale bearing member trained over said first pair of spools, a second pair of spools mounted one each on each of said axle members adjacent the second of said halves and in close juxtaposition to said first pair of spools, a second endless flat belt type of logarithmic scale bearing member trained over said second pair of spools and disposed in juxtaposition to said first scale bearing member, an opening in said frame structure through which a portion of the runs of both of said scale bearing members may be observed, a reference line extending across said opening transversely to the length of said scale bearing members, and manually operable means effective optionally to move either of said scale bearing members about the spools on which it is mounted independently of the other scale bearing member or to move both of said scale bearing members simultaneously and uniformly about their respective pairs of spools.

2. In a logarithmic system calculating device, a frame structure including parallel side portions and a top portion having a viewing opening therein, a pair of endless belts arranged in side by side relation and housed within said frame structure, belt supporting means carried by said frame structure comprising a pair of freely rotatable spools for each of said belts constructed and arranged to position portions of said belts in close adjacency to said viewing opening; each of said belts carrying a logarithmic scale coextensive in length with the length of the belt surface exposed to view through said viewing opening incident to movement of the belt around said belt supporting means, and belt manipulating devices freely reciprocably mounted on said parallel side portions of said frame structure including manually operable belt clamping means extending through said side portions of said frame effective to grip said belts either singly or in unison incident to movement of said belts about said belt supporting means by said devices.

3. In a logarithmic system calculating device, a frame structure including parallel side portions and a top portion having a scale viewing opening therein, a pair of endless belts arranged in side by side relation on said frame structure, belt supporting means on said frame structure comprising a pair of freely rotatable spools at one end of said structure each being engaged by one each of said belts, a second pair of freely rotatable spools at the other end of said frame structure each engaging one each of said belts; one run of each of said belts being disposed in close parallel adjacency to said viewing opening, each of said side portions having a slot therein extending longitudinally of said frame structure adjacent to the top portion thereof, and manually operable belt transporting means comprising a carriage having a frame member extending transversely of said frame structure beneath said one run of each of said belts and mounted in and guided by said slots for free movement longitudinally of said slots and carrying manually operable belt clamping devices externally of said frame structure operable through said slots to clamp said one run of either or both of said belts to said carriage frame member.

4. In a logarithmic system calculating device, a frame structure, a pair of endless belts arranged in side by side relation and housed in said frame structure, belt supporting means housed in said frame structure and comprising a pair of freely rotatable spools mounted on spaced, parallel axes for each of said belts, a viewing opening in said frame structure disposed adjacent to parallel runs of said belts; each of said belts carrying a logarithmic scale coextensive with the length of the belt surface exposed to view incident to movement of the belt around said belt supporting means, a reference line extending across said opening transversely of the length of said belts, and devices mounted for free reciprocable movement on said frame structure parallel to the length of the runs of said belts adjacent said viewing opening; said devices including a member extending transversely of and underlying said runs, and manually operable belt clamping devices carried by said member and disposed beneath said viewing opening.

5. In a logarithmic system calculating device, a frame structure including parallel side portions and a top portion having a scale viewing opening therein, a pair of endless belts arranged in side by side relation in said frame structure, belt supporting means carried by said frame structure comprising a pair of freely rotatable spools for each belt located at opposite ends of said frame structure over which the belt is trained; each of said pairs of spools being so disposed that one run of each belt is disposed in close adjacency to said viewing opening, a reference line extending across said opening transversely to the length of said belts, and manually operable devices effective optionally to move either of said belts about its supporting means independently of the other belt or to move both of said belts simultaneously and in unison; said belt moving devices comprising a carriage freely reciprocably mounted on said side portions of said frame structure and including an element extending below said one run of both of said belts and separate, manually operable clamping means effective to releasably clamp said belts to said element mounted on said carriage and extending through said side portions of said frame structure; one of said clamping devices being disposed externally of and adjacent to one of said side portions of said frame structure and the other of said clamping devices being correspondingly disposed relative to the other of said side portions of said frame structure.

6. In a logarithmic system calculating device, a frame structure including parallel side walls, a pair of endless belts arranged in side by side relation and housed in said frame structure, belt supporting means housed in said frame structure and comprising a pair of freely rotatable spools mounted on spaced, parallel axes for each of said belts, a viewing opening in said frame structure disposed adjacent to parallel runs of said belts, a reference line extending across said opening transversely of the length of said belts, and devices freely reciprocably mounted on and extending through said side walls including means manually operable to clampingly engage either or both of said belts and to move the belt or belts clampingly engaged thereby in either direction on said belt supporting means incident to movement of said devices on said frame structure; each of said clamping means including a manually operable lever carried by said devices and disposed externally of said frame structure, a reciprocable wedge element extending through one of said side walls and having one end thereof connected to said lever externally of the side wall and having the opposite end thereof tapered and disposed above the belt adjacent thereto, and an abutment overlying said tapered end of said wedge element effective upon movement of said wedge element in one direction by said lever to move said tapered end against said belt.

References Cited in the file of this patent

UNITED STATES PATENTS

| | | |
|---|---|---|
| 2,135,649 | Thorne | Nov. 8, 1938 |
| 2,578,705 | Johnson | Dec. 18, 1951 |
| 2,615,630 | Eckel | Oct. 28, 1952 |

FOREIGN PATENTS

| | | |
|---|---|---|
| 100,526 | Austria | July 25, 1925 |
| 647,795 | Germany | July 13, 1937 |